United States Patent [19]

Scheid

[11] Patent Number: 4,698,717
[45] Date of Patent: Oct. 6, 1987

[54] ELECTRICAL SAFETY DROP DISCONNECT

[76] Inventor: William J. Scheid, 3728 W. 215th St., Unit 203, Matteson, Ill. 60443

[21] Appl. No.: 751,311

[22] Filed: Jul. 2, 1985

[51] Int. Cl.$^4$ .............................................. H02H 7/26
[52] U.S. Cl. ...................................... 361/1; 307/119; 361/114; 439/369; 439/371; 439/449
[58] Field of Search .............................. 361/1, 58, 114; 307/112, 119, 139, 140, 147, 148; 339/75 R, 75 M

[56] References Cited

U.S. PATENT DOCUMENTS 3,111,355 11/1963 Samburoff et al. ............... 339/75 M
3,345,604 10/1967 Henschen et al. ..................... 339/75
4,332,432 6/1982 Colleran ............................ 339/75 M Primary Examiner—A. D. Pellinen
Assistant Examiner—Jeffrey A. Gaffin
Attorney, Agent, or Firm—Eugene F. Friedman

[57] ABSTRACT

An electrical safety disconnect device inserted in overhead power wires to prevent live broken wires from contacting the ground or persons in their vicinity. The device takes the form of a male-female plug combination that automatically separates when the wire experiences a predetermined force generally less than that required to break the wire itself. A band encircles both the male and female components to hold them together and maintain the electrical connection. This band breaks when a predetermined stress pulls on the wires to allow the male and female portions to separate. The device sits on the wire near to the pole closer to the source of electricity. Upon separating, as in a storm for example, the "live" end of the wire hangs above the ground where it cannot contact people or other objects. Placing the female component on this portion of the wire provides additional protection to the environs.

23 Claims, 4 Drawing Figures

U.S. Patent  Oct. 6, 1987  4,698,717
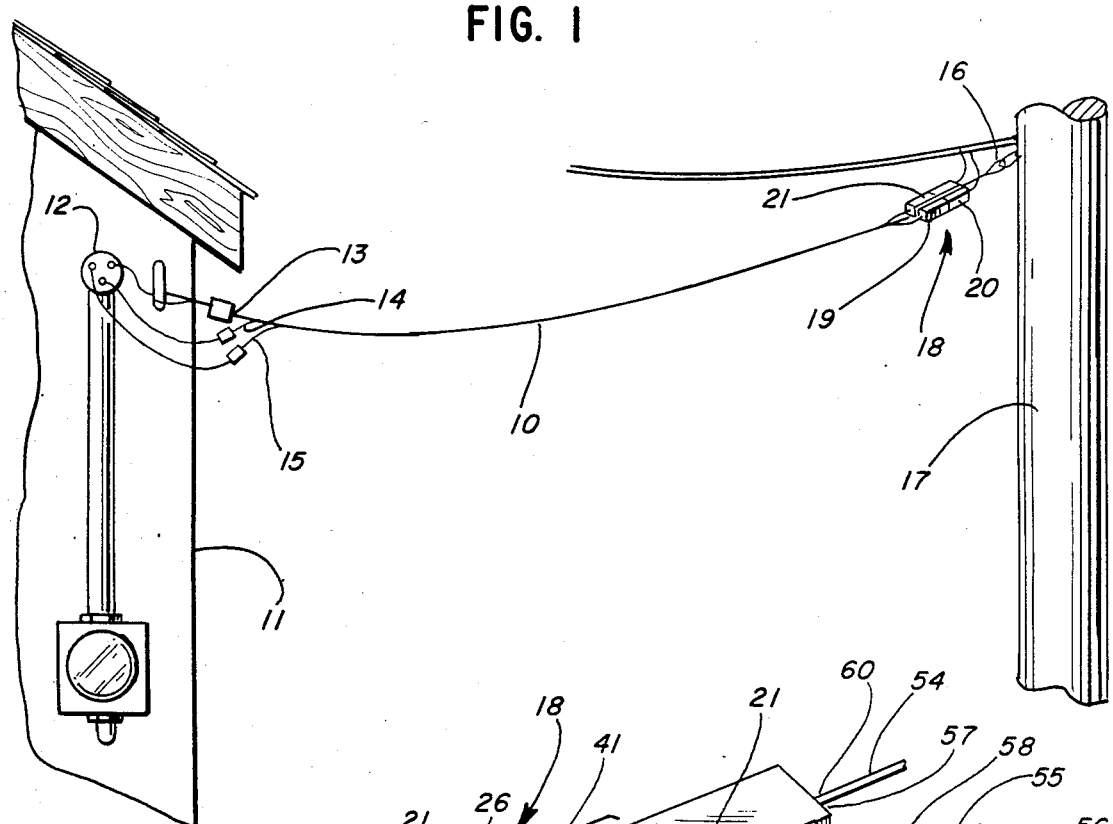
FIG. 1
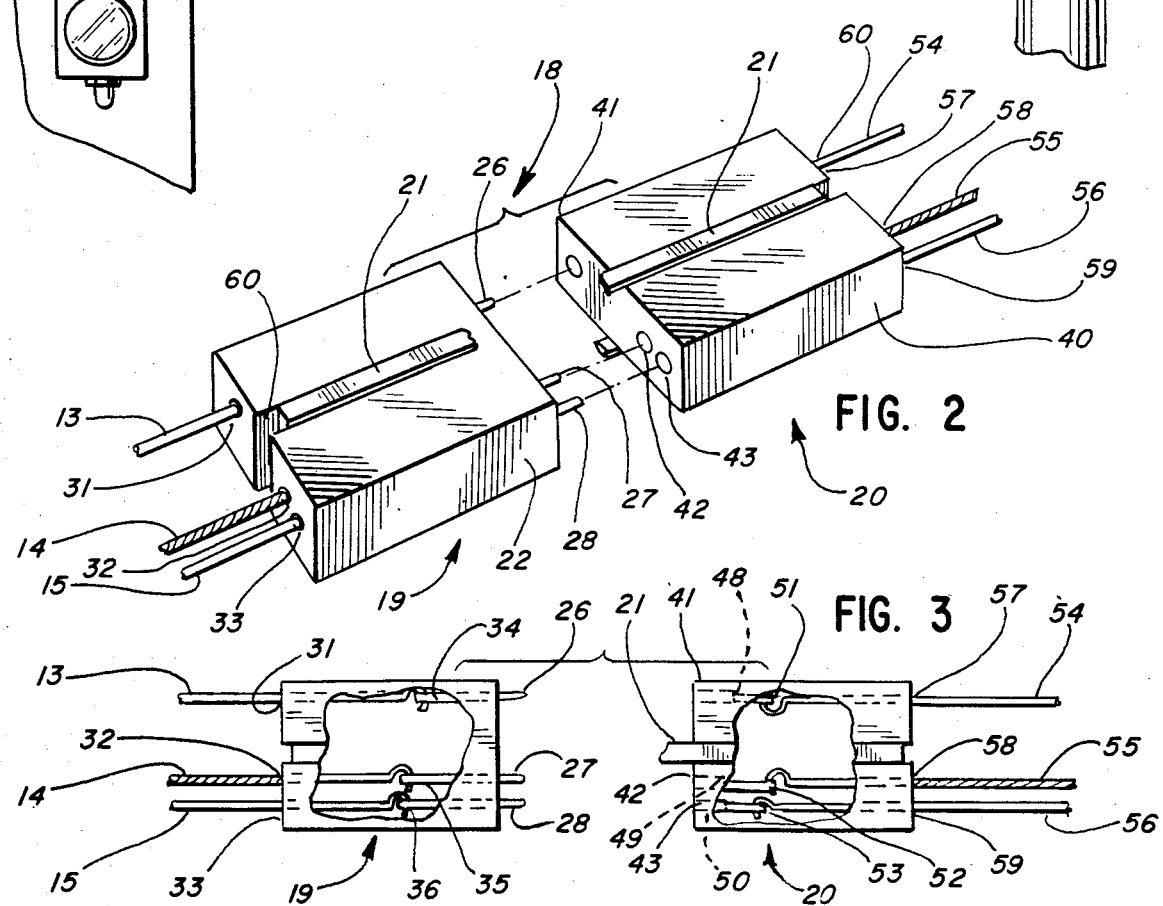
FIG. 2
FIG. 3
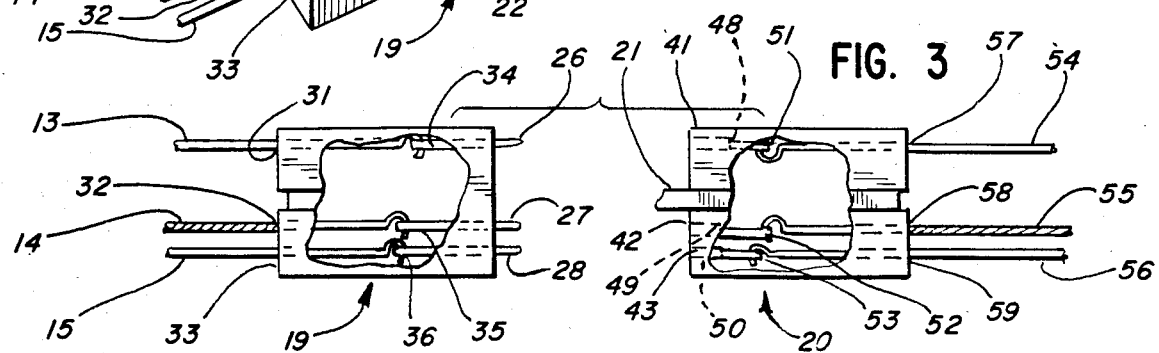
FIG. 4
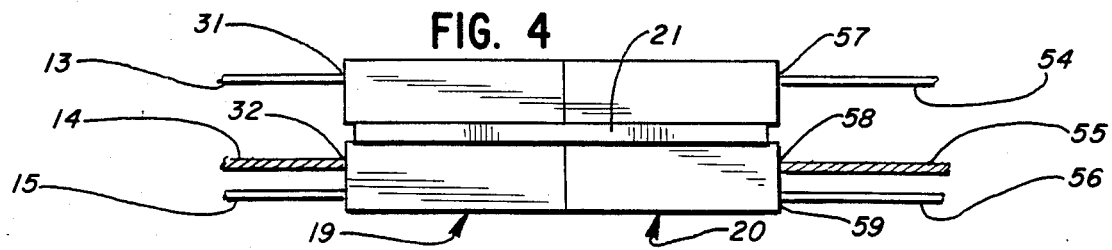

ELECTRICAL SAFETY DROP DISCONNECT

BACKGROUND

Electrical power from a public utility constitutes a necessity in today's society. Often power travels to individual buildings through overhead wires extending from utility poles. These wires experience various hazards. High winds or ice storms can tear the wires from their mountings or break the wires themselves. Trees falling against the power lines can pull them down. Any breakage or dislodging of these wires creates a hazard because of their live electrical current. Contact with a broken power line and the accompanying voltage can cause significant injury or even death. Furthermore, repairing and reconnecting the downed lines requires much time and expense with the power turned off to permit the splicing and reconnecting of the wires. This often necessitates the labor of several workmen and their accompanying equipment to return the wires to a proper condition.

SUMMARY

Accordingly, a safety disconnect device which preferentially "breaks" the wire at a safe location will reduce or avoid the hazards of live, downed power wires electrocuting people as well as the expense of repairing these wires. Typically, the wires should "break" in the vicinity of the utility pole sufficiently close to the source of the electrical power so that the wires remain out of contact with the ground or surrounding objects. Preferably, the live end remains at a height above the ground so that it cannot contact an individual standing nearby.

The controlled break in the wire should occur upon the exertion of a predetermined stress resulting from ice, trees, or winds. Naturally, the device must cause the separation upon an exertion of a force less than that necessary to break the attached wires. Finally, the disconnect device may allow for quick reattachment without excessive equipment.

The safety device includes a first member, generally in the form of a male plug. The male plug possesses a substantially nonconducting housing. A first connector, elongated in shape and electrically conductive, extends from the housing. An adjoining means permits the connecting of the conductor to an electrical wire.

As a further component, the safety device includes a second member with typically takes the form of a female plug to receive the male plug. The second member also has a substantially electrically nonconducting housing. Openings in the housing allow the entrance of the connector of the male plug.

Once inside, the male connector electrically contacts a second connector coupled to the female plug's housing. A second adjoining means lets the female connector attach to an electrical wire.

A coupling device, in contact with the male and female plugs, holds them together. Yet, upon the application of a set force pulling the plugs apart, it lets them separate from each other.

When the two members separate, they break the electrical connection. The portion of the wire falling to the ground carries no electrical current to endanger property or passersby.

The live wire should normally remain suspended at a sufficient height above the ground to avoid any danger. Ideally, the live portion has the female plug at its end. Thus, it prevents accidental contact with an open circuit even when an individual works to reestablish electrical service.

To reattach the wires and restore electrical service, a single individual may reconnect the plugs of the safety device. Attaching a new coupling means holds the members together.

Accordingly, the device assures safety to individuals and property even in the event of a break in the power lines. The reattachment of the wires after a separation proves a simple and safe task necessitating no complex equipment or large crew.

BRIEF DESCRIPTION OF THE FIGURES

FIG. 1 displays an electrical safety device on wires extending between a building and a utility pole.

FIG. 2 gives an isometric view of the device of FIG. 1 prior to coupling.

FIG. 3 gives a cutaway top plan view of the two component safety device of FIG. 1.

FIG. 4 shows a top plan view of the safety device after the two housings have been joined and secured by the coupling means.

DETAILED DESCRIPTION

Referring initially to FIG. 1, the electrical wire 10 brings current to the building 11 by connecting to the building's electrical system 12. Typically, the cable 10 includes several individual strands 13, 14, and 15. At the other end, the cable 16, attached to the utility pole 17, supports the wire 10.

The safety disconnect device 18 connects to the individual wires 13, 14, and 15 at a point near the utility pole 17. This device 18 includes the plug 19 and the receptacle 20, held together by the coupling band 21.

In FIG. 2, the plug 19 has the substantially nonconductive housing 22 enclosing the remaining components. The prongs 26, 27, and 28, constructed of an electrically conductive material, project from the body of the plug 19. The electrical wires 13, 14, and 15 enter the plug housing through the apertures 31, 32, and 33. The openings 34, 35, and 36, in the prongs 26, 27, and 28, respectively, of FIG. 3 couple the wires 13, 14, and 15 to their respective prongs.

Similarly, the receptacle 20 has the nonconductive housing 40. The openings 41, 42, and 43 in the casing 40 allow the prongs 26, 27, and 28, respectively, to enter the receptacle 20. When inserted into the openings 41, 42, and 43, prongs 26, 27, and 28 contact the female connectors 48, 49, and 50, respectively, and complete an electrical circuit. The female connectors 48 to 50 lie recessed within the housing 40 to avoid contact with a worker handling the receptacle 20.

The openings 51, 52, and 53 couple the female connectors 48, 49, and 50 to the wires 54, 55, and 56. These wires 54, 55, and 56 exit the receptacle housing 40 through the separate apertures 57, 58, and 59 and connect to a source of electricity.

The band 21 represents a unit separate from the plug 19 and the receptacle 20. Encircling both the plug 19 and the receptacle 20, the band 21 holds them together. This assures that the prongs 26, 27, and 28 remain in contact with the female connectors 48, 49, and 50. Setting the coupling band 21 within the recess 60 in the plug 19 and receptacle 20 further stabilizes the safety device 18.

The band 21 may take the form of a closed loop. Additionally or alternately, an adhesive may hold the band 21 in place.

In use, ice, falling tree branches, or other problems may cause a strain upon the wire 10. When the resulting force reaches a preset level, the coupling band 21 breaks. The plug 19 and the receptacle 20 then separate and sever the electrical connection. The preset level should remain less than the strain which will cause the wires 13, 14, and 15 to break. Naturally, the force to separate the safety device 18 by breaking the band 21 and disengaging the plug 19 from the receptacle 20 must exceed the weight of the wire 10 itself. This assures that wires 13, 14, and 15 do not break.

The receptacle 20, attached to the source of electricity, remains suspended from the utility pole 17 at a sufficient height to avoid any danger to passersby. Generally, maintaining the receptacle 20 at least ten feet above the ground will safeguard individuals from the current.

Furthermore, recessing the female connectors 48, 49, and 50 within the nonconductive housing 33 prevents accidental contact with the live circuit. The plug 19, when it falls to the ground, presents no hazard to people or property since it then carries no current.

To reassemble the safety device, a single individual may bring the plug 19, with the attached cable 10, up to the receptacle 20. He then inserts prongs 26, 27, and 28 into the openings 41, 42, and 43 in the receptacle housing. There they contact the female connectors 48, 49, and 50, and allow current to flow. Securing a new coupling band around the plug 22 and the receptacle 21 within the recess 60 completes the reassembly.

What is claimed is:

1. An electrical separating device comprising:
   (A) a first member having:
      (1) a first electrically nonconductive housing with first opening means:
      (2) a first elongated connector, coupled to said housing, composed of an electrically conductive substance extending from inside said first housing through said first opening means in said housing and projecting outside of said housing; and
      (3) first adjoining means, coupled to said first connector and located inside of said first housing, for connecting said first connector to an electrical wire;
   (B) a second member having:
      (1) a second substantially electrically nonconductive housing with second opening means into which said first connector may enter;
      (2) a second connector, coupled to said second housing, composed of an electrically conductive substance and positioned within said second housing, to make contact with said first connector entered into said second opening means, establishing an electrical connection between said first and second connectors; and
      (3) second adjoining means, coupled to said second connector and located inside of said second housing, for connecting said second connector to an electrical wire; and
   (C) coupling means, separate from and in contact with said first and second members, for, in addition to friction between said first and second members, holding said first and second members together but, upon a nonmanual disengagement of said coupling means from between said first and second members, pemitting said said first and second members to separate from each other upon the exertion of a predetermined force pulling said first and second connectors apart from each other.

2. The device of claim 1 wherein (1) said first member includes two first elongated connectors coupled to said first housing and extending from inside said first housing through said first opening means, and said second member contains two second connectors adjacent to said second opening means in said second housing; (2) said second opening means permits both said first members to enter said second housing; and (3) each of said second connectors is positioned within said second housing to, with said first connectors entered through said second opening, contact one of said first connectors.

3. The device of claim 2 wherein said coupling means includes an elongated strip of material encircling said first and second members and which, upon exertion of a predetermined stress pulling said first and second members apart, breaks.

4. The device of claim 3 wherein said strip is secured to said first and second members with adhesive.

5. The device of claim 3 wherein said elongated strip takes the form of a closed loop.

6. The device of claim 5 wherein the exterior of said first and second housings includes a recess into which fits said coupling means.

7. The device of claim 6 wherein (1) said first member includes at least three elongated first connectors coupled to said first housing and extending from inside said first housing through said first opening means and said second member contains at least three second connectors adjacent to said second opening means in said second housing; (2) said second opening means permits all three of said first connectors to enter said second housing; and (3) each of said second connectors is positioned within said second housing to, with said first connectors entered through said second opening means, to contact one of said first connectors.

8. The device of claim 2 further including a first set of electrical wires, at least one wire of said first set being connected, within said first housing by said first adjoining means, to each of said first connectors, and extending through a first aperture in said first housing; and a second set of electrical wires, at least one wire of said second set being connected, within said second housing by said second adjoining means, to each of said second connectors and extending through a second aperture in said second housing.

9. The device of claim 8 wherein said predetermined force is less than the force necessary to break either said first set or second set of said wires.

10. The device of claim 9 wherein said coupling means includes an elongated strip of material encircling said first and second members and which, upon exertion of a predetermined stress pulling said first and second members apart, breaks.

11. The device of claim 10 wherein said strip is secured to said first and second members with adhesive.

12. The device of claim 10 wherein said elongated strip takes the form of a closed loop.

13. The device of claim 12 wherein the exterior of said first and second housings includes a recess into which fits said coupling means.

14. The device of claim 8 wherein said first and second sets of wires are attached to poles suspending them over the ground.

15. The device of claim 14 wherein said predetermined force is less than the force necessary to break either said first or second sets of wires.

16. The device of claim 15 wherein said predetermined force is greater than the force exerted by the weight of the wire.

17. The device of claim 16 wherein said coupling means includes an elongated strip of material encircling said first and second members and which, upon exertion of a predetermined stress pulling said first and second members apart, breaks.

18. The device of claim 17 wherein (1) said second set of wires connects to a source of electricity and has a point of attachment to a rigid stationary object at a fixed height above the ground and (2) said second member is attached to said second set of wires at a distance from said point of attachment of said second set less than said hegith of said point of attachment above the ground.

19. The device of claim 18 wherein said strip is secured to said first and second members with adhesive.

20. The device of claim 18 wherein said elongated strip takes the form of a closed loop.

21. The device of claim 20 wherein the exterior of said first and second housings includes a recess into which fits said coupling means.

22. The device of claim 19 wherein said height exceeds said distance by at least ten feet.

23. The device of claim 21 wherein height exceeds said distance by at least ten feet.

* * * * *